United States Patent Office 3,705,166
Patented Dec. 5, 1972

3,705,166
ACRYLIC ACID DERIVATIVES OF 2,2,6,6-TETRA-
METHYLPIPERIDINES
Keisuke Murayama and Syoji Morimura, Tokyo, Japan, assignors to Sankyo Company Limited
No Drawing. Filed Aug. 6, 1970, Ser. No. 61,860
Claims priority, application Japan, Aug. 15, 1969, 44/64,541
Int. Cl. C07d 29/30
U.S. Cl. 260—293.86                                  8 Claims

ABSTRACT OF THE DISCLOSURE

New acrylic acid derivatives having the Formulae I and II (I) and (II) structures wherein $R_1$ represents hydrogen atom or cyano group; $R_2$ and $R_3$ may be the same or different and each represents hydrogen atom or methyl group; and X represents imino group or oxygen atom. They are useful as a stabilizer for the deterioration of various synthetic polymers and also copolymerized to form new highly light-stable polymeric compounds. The acrylic acid derivatives (I) and (II) are produced by reacting a piperidine derivative having the formula (III)

wherein $R_1$ and X are as defined above with a reactive derivative of an unsaturated aliphatic carboxylic acid having the formula $$R_3-CH=C(R_2)-COOH$$   (IV)

wherein $R_2$ nd $R_3$ are as defined above.

---

This invention relates to a new class of acrylic acid derivatives and a process for preparing the same.

More particularly, it is concerned with the acrylic acid derivatives having the Formulae I and II (I) and (II)

wherein $R_1$ represents hydrogen atom or cyano group; $R_2$ and $R_3$ may be the same or different and each represents hydrogen atom or methyl group; and X represents imino group or oxygen atom and also with a process for preparing them.

The acrylic acid derivatives of the above Formulae I and II are all new substances undisclosed in the prior art. They are as such useful as a stabilizer for the photo- and thremal-deterioration of various synthetic polymers, e.g., polyolefins, polyvinyl chloride, polyamides, polyurethanes and the like. They may be also subjected to a graft-copolymerization with other polymers or to a copolymerization with the monomer of said polymer to form a wide variety of polymeric substances having an excellent light stability.

Where the acrylic acid derivatives (I) and (II) of this invention are to be employed as a stabilizer, they may be readily incorporated into the synthetic polymers by various standard procedures commonly utilized in the art. The present compounds may be incorporated into the synthetic polymers at any desired stage prior to the manufacture of shaped articles therefrom. Thus, for example, the present compounds in the form of a powder may be mixed with the synthetic polymer, or a suspension or emulsion of the present compound may be mixed with suspension or emulsion of the synthetic polymer.

The amount of the present compounds may vary widely depending upon the type, properties and particular uses of the synthetic polymer to be stabilized. In general, the present compounds of the Formulae I and II may be added in an amount ranging from 0.01 to 5.0% by weight, based on the amount of the synthetic polymer, but the practical range is varied depending upon the type of the synthetic polymer.

The present compounds may be used alone or in combination with other known stabilizers, fillers, pigments and the like.

If desired, two or more of the present compounds may also be satisfactorily used in admixture.

It is, accordingly, an object of this invention to provide new acrylic acid derivatives of the above Formulae I and II which possess a high stabilizing activity against the photo- and thermal-deterioration of various synthetic polymers.

Another object of this invention is to provide a process for the preparation of such valuable acrylic acid derivatives of the above Formulae I and II.

These and other objects of this invention will become apparent to those skilled in the art from the following description of this invention.

Representative examples of the acrylic acid derivatives (I) and (II) of this invention are given hereinbelow.

4-acrylamido-2,2,6,6-tetramethylpiperidine;
4-acryloyloxy-2,2,6,6-tetramethylpiperidine;
4-acryloyloxy-4-cyano-2,2,6,6-tetramethylpiperidine;
4-acrylamido-4-cyano-2,2,6,6-tetramethylpiperidine;
1-acryloyl-4-acryloyloxy-2,2,6,6-tetramethylpiperidine;
1-acryloyl-4-acrylamido-2,2,6,6-tetramethylpiperidine;
1-acryloyl-4-acryloyloxy-4-cyano-2,2,6,6-tetramethylpiperidine;
1-acryloyl-4-acrylamido-4-cyano-2,2,6,6-tetramethylpiperidine;
4-crotonoyloxy-2,2,6,6-tetramethylpiperidine;
4-crotonamido-2,2,6,6-tetramethylpiperidine;
4-cyano-4-crotonoyloxy-2,2,6,6-tetramethylpiperidine;
4-cyano-4-crotonamido-2,2,6,6-tetramethylpiperidine;
1-crotonoyl-4-crotonoyloxy-2,2,6,6-tetramethylpiperidine;
1-crotonoyl-4-crotonamido-2,2,6,6-tetramethylpiperidine;
1-crotonoyl-4-crotonoyloxy-4-cyano-2,2,6,6-tetramethylpiperidine;
1-crotonoyl-4-crotonamido-4-cyano-2,2,6,6-tetramethylpiperidine;
4-methacryloyloxy-2,2,6,6-tetramethylpiperidine;

4-methacrylamido-2,2,6,6-tetramethylpiperidine;
1-methacryloyl-4-methacrylamido-2,2,6,6-tetramethylpiperidine;
4-cyano-4-methacrylamido-2,2,6,6-tetramethylpiperidine; and
4-tiglamido-2,2,6,6-tetramethylpiperidine.

In accordance with this invention, there is provided a process for the preparation of the acrylic acid derivatives (I) and (II), which comprises, briefly, reacting a piperidine derivative having the formula

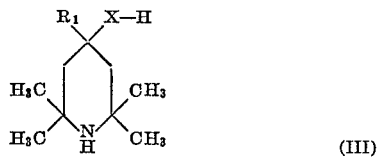

(III)

wherein $R_1$ and $X$ are as defined above with a reactive derivative of an unsaturated aliphatic carboxylic acid having the formula

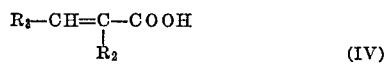

(IV)

wherein $R_2$ and $R_3$ are as defined above.

More particularly, the process of this invention comprises reacting the piperidine derivative having the above Formula III with the reactive derivative of the carboxylic acid having the above Formula IV in a molar ratio of 1:1 to less than 2 to produce the acrylic acid derivative having the above Formula I or reacting the piperidine derivative having the above Formula III with the reactive derivative of the carboxylic acid having the above Formula IV in a molar ratio of 1:2 or more to produce the acrylic acid derivative having the above Formula II.

In carrying out the process of this invention, the reaction may be suitably effected in the presence or absence of a non-polar solvent. Suitable examples of such solvents include benzene, toluene, xylene and the like. The reactive derivatives of the unsaturated aliphatic carboxylic acids having the above Formula IV include acid halides, e.g., acid chloride, acid anhydrides, esters and the like. The reaction temperature and period are not critical features of this invention, but the reaction is usually carried out at room temperature or a higher temperature.

In one of the preferred embodiments of this invention, the reactive derivative of the unsaturated aliphatic carboxylic acid having the above Formula IV is added with stirring under ice-cooling or at room temperature to the starting piperidine derivative having the above Formula III in the presence or absence of the non-polar solvent and then the resulting mixture is stirred at room temperature or about 40–110° C. for about 3–10 hours.

As explained hereinabove, where the starting piperidine derivative (III) and the reactive derivative of the carboxylic acid (IV) are employed in a molar ratio of 1:1 to less than 2, there produced the desired product (I) and, where a molar ratio of 1:2 or more is employed, there produced the desired product (II).

Where the acid halide of the carboxylic acid (IV) is employed as a reagent in this process, the reaction may be preferably effected in the presence of a conventional acid-binding agent such as an organic base, e.g., triethylamine, pyridine and the like, and, where the ester, of the carboxylic acid (IV) is employed as a reagent in this process, the reaction may be preferably effected in the presence of a conventional basic catalyst such as an alkali metal alcoholate, e.g. sodium methylate, sodium ethylate and the like, since the more rapid and smooth reaction can be accomplished.

Where the acid anhydride of the carboxylic acid (IV) is employed as a reagent in this process, the reaction may be preferably effected in a non-polar solvent without the employment of said acid-binding agent or basic catalyst.

After completion of the reaction, the reaction product may be easily recovered and purified by a conventional method. For instance, where the acid-binding agent is employed in the reaction, after the salt formed in situ is removed by filtration, the filtrate is concentrated and the residue is subjected to recrystallization or distillation under reduced pressure to give the desired product in a pure form. Where the acid-binding agent is not employed, the reaction mixture is concentrated and the residue is treated in the same manner as above to give the desired product. Where the acid anhydride is employed, the reaction product may be recovered by neutralizing the reaction mixture or making it basic with a suitable base and then subjecting the reaction mixture to extraction or filtration.

Of the starting piperidine derivatives (III) which may be employed in the process of this invention, 4-amino-4-cyano - 2,2,6,6 - tetramethylpiperidine is a new substance and such a compound can be readily prepared, for example, by reacting 2,2,6,6 - tetramethyl - 4 - oxopiperidine with potassium cyanide and ammonium chloride.

The following examples are given for the purpose of illustrating this invention, but they should not be construed to be limiting the scope of this invention.

EXAMPLE 1

4-acryloyloxy-2,2,6,6-tetramethylpiperidine

To a solution of 5.2 g. of 4-hydroxy-2,2,6,6-tetramethylpiperidine and 4 g. of triethylamine in 150 ml. of benzene was added dropwise with stirring and ice-cooling a solution of 3 g. of acryloyl chloride in 50 ml. of benzene. After completion of the dropwise-addition, the resulting mixture was stirred under ice-cooling for 1 hour and then at room temperature for additional 8 hours. Triethylamine hydrochloride precipitated was removed by filtration, the filtrate was washed with an aqueous sodium bicarbonate solution and then dried over potassium carbonate. The benzene was distilled off and the residue was subjected to distillation under reduced pressure to give the desired product as colorless oils boiling at 137° C./2 mm. Hg.

*Analysis.*—Calculated for $C_{12}H_{21}NO_2$ (percent): C, 68.21; H, 10.02; N, 6.63. Found (percent): C, 68.25; H, 9.96; N, 6.55.

IR (liquid film): $\nu_{c=o}$ 1730 cm.$^{-1}$; $\nu_{c=c}$ 1650 cm.$^{-1}$.

EXAMPLE 2

4-acrylamido-2,2,6,6-tetramethylpiperidine

To a solution of 7.5 g. of 4-amino-2,2,6,6-tetramethylpiperidine and 6 g. of triethylamine in 100 ml. of benzene was added dropwise with stirring and ice-cooling a solution of 4.5 g. of acryloyl chloride in 50 ml. of benzene. After completion of the dropwise-addition, the resulting mixture was stirred under ice-cooling for 1 hour and then at room temperature for additional 5 hours. Triethylamine hydrochloride precipitated was removed by filtration, the filtrate was washed with an aqueous sodium bicarbonate solution and then dried over potassium carbonate. The benzene was distilled off and the residue was subjected to distillation under reduced pressure to give the colorless oil boiling at 128–129° C./0.03 mm. Hg, which crystallized immediately after cooling. The crystalline substance thus obtained was then recrystallized from petroleum benzene to give the desired product as white crystals melting at 117° C.

*Analysis.*—Calculated for $C_{12}H_{22}N_2O$ (percent): C, 68.53; H, 10.54; N, 13.32. Found (percent): C, 68.46; H, 10.60; N, 13.38.

IR (Nujol mull) $\nu_{c=o}$ 1665 cm.$^{-1}$; $\nu_{c=c}$ 1634 cm.$^{-1}$.

EXAMPLE 3

4-acrylamido-4-cyano-2,2,6,6-tetramethylpiperidine

The reaction was conducted by the same procedure as in the above Example 2 except that 9 g. of 4-amino-4-cyano-2,2,6,6-tetramethylpiperidine and 4.5 g. of acryloyl chloride were employed. After completion of the reaction, triethylamine hydrochloride was removed by filtration, the filtrate was washed with an aqueous sodium bicarbonate solution and then dried over potassium carbonate. The benzene was distilled off and, upon addition of ether, the residue crystallized. The crystalline substance was recovered by filtration and recrystallized from aqueous methanol to give the desired product as white crystals melting at 148–149° C.

*Analysis.*—Calculated for $C_{13}H_{21}N_3O$ (percent): C, 66.35; H, 9.00; N, 17.86. Found (percent): C, 66.39; H, 9.12; N, 17.88.

$\nu_{C=C}$ 1630 cm.$^{-1}$.

IR (Nujol mull): $\nu_{C\equiv N}$ 2220 cm.$^{-1}$; $\nu_{C=O}$ 1685 cm.$^{-1}$;

EXAMPLE 4

1-acryloyl-4-acrylamido-2,2,6,6-tetramethylpiperidine

To a solution of 7.8 g. of 4-amino-2,2,6,6-tetramethylpiperidine and 15 g. of triethylamine in 100 ml. of benzene was added dropwise with stirring and ice-cooling a solution of 10 g. of acryloyl chloride in 70 ml. of benzene. After completion of the dropwise-addition, the resulting mixture was stirred under ice-cooling for 1 hour and then at 40–45° C. for additional 6 hours. After cooling triethylamine hydrochloride precipitated was removed by filtration, the filtrate was washed with an aqueous sodium bicarbonate solution and then dried over potassium carbonate. The benzene was distilled off and the residue was recrystallized from benzene to give the desired product as white crystals melting at 113° C.

*Analysis.*—Calculated for $C_{15}H_{24}N_2O_2$ (percent): C, 68.15; H, 9.15; N, 10.60. Found (percent): C, 68.08; H, 9.22; N, 10.51.

IR (Nujol mull): $_{C=O}$ 1673, 1655 cm.$^{-1}$; $\nu_{C=C}$ 1636, 1605 cm.$^{-1}$.

EXAMPLE 5

1-acryloyl-4-acrylamido-4-cyano-2,2,6,6-tetramethylpiperidine

The same procedure as in the above Example 4 was repeated except that 9 g. of 4-amino-4-cyano-2,2,6,6-tetramethylpiperidine and 9 g. of acryloyl chloride were employed and the residue was recrystallized from benzene to give the desired product as white crystals melting at 187–188° C.

*Analysis.*—Calculated for $C_{16}H_{23}N_3O_2$ (percent): C, 66.41; H, 8.01; N, 14.52. Found (percent): C, 66.44; H, 8.10; N, 14.54.

IR (Nujol mull): $\nu_{C\equiv N}$ 2230 cm.$^{-1}$; $\nu_{C=O}$ 1679 cm.$^{-1}$; $\nu_{C=C}$ 1635, 1630 cm.$^{-1}$.

EXAMPLE 6

4-crotonoyloxy-2,2,6,6-tetramethylpiperidine

A mixture of 15.7 g. of 4-hydroxy-2,2,6,6-tetramethylpiperidine with 15.4 g. of crotonic anhydride was heated to 50–60° C. with stirring to give a uniform solution. The solution was heated and stirred at that temperature for additional 2–3 hours, whereby the solution solidified. Heating at that temperature with stirring was continued for an additional 2–3 hours. After cooling, the reaction mixture was poured onto crushed ice, neutralized by addition of sodium carbonate and then extracted with ether. The ether extract was dried over potassium carbonate, the ether was distilled off and the residue was subjected to distillation under reduced pressure to give the desired product as colorless oils boiling at 98–99° C./2 mm. Hg.

*Analysis.*—Calculated for $C_{13}H_{23}NO_2$ (percent): C, 69.29; H, 10.29; N, 6.22. Found (percent): C, 69.34; H, 10.22; N, 6.30.

IR (liquid film): $\nu_{C=O}$ 1735 cm.$^{-1}$; $\nu_{C=C}$ 1660 cm.$^{-1}$.

EXAMPLE 7

4-crotonamido-2,2,6,6-tetramethylpiperidine

To 15.6 g. of 4-amino-2,2,6,6-tetramethylpiperidine was added dropwise 15.4 g. of crotonic anhydride while heating to 40–50° C. and stirring. After completion of the dropwise-addition, the reaction mixture was heated at that temperature with stirring for additional 2–3 hours, whereby the reaction mixture solidified. After cooling, the reaction mixture was poured onto crushed ice, neutralized by addition of sodium carbonate and then extracted with ether. The ether extract was dried over potassium carbonate, the ether was distilled off and the residue was recrystallized from benzene to give the desired product as white crystals melting at 148° C.

*Analysis.*—Calculated for $C_{13}H_{24}N_2O$ (percent): C, 69.60; H, 10.78; N, 12.49. Found (percent): C, 69.66; H, 10.71; N, 12.52.

IR (Nujol mull): $\nu_{C=O}$ 1672 cm.$^{-1}$; $\nu_{C=C}$ 1628 cm.$^{-1}$.

EXAMPLE 8

4-crotonoyloxy-4-cyano-2,2,6,6-tetramethylpiperidine

A mixture of 9.0 g. of 4-cyano-4-hydroxy-2,2,6,6-tetramethylpiperidine with 8.0 g. of crotonic anhydride was heated to 60–70° C. with stirring to form a uniform slurry. The slurry was stirred at that temperature for additional 4–5 hours, whereby the slurry solidified. After cooling, the reaction mixture was poured onto crushed ice, neutralized by addition of sodium carbonate and then extracted with benzene. The benzene extract was dried over potassium carbonate, the benzene was distilled off and the residue was subjected to distillation under reduced pressure to give the desired product as colorless and viscous oils boiling at 143–146° C./2 mm. Hg.

*Analysis.*—Calculated for $C_{14}H_{22}N_2O_2$ (percent): C, 67.17; H, 8.86; N, 11.19. Found (percent): C, 67.22; H, 8.88; N, 11.20.

IR (liquid film): $\nu_{C\equiv N}$ 2210 cm.$^{-1}$; $\nu_{C=O}$ 1735 cm.$^{-1}$; $\nu_{C=C}$ 1650 cm.$^{-1}$.

EXAMPLE 9

1-crotonoyl-4-crotonoyloxy-2,2,6,6-tetramethylpiperidine

A mixture of 7.8 g. of 4-hydroxy-2,2,6,6-tetramethylpiperidine, 15.4 g. of crotonic anhydride and 12.0 g. of sodium carbonate was heated to 60–70° C. with stirring to form a uniform slurry. The slurry was heated to 70–80° C. with stirring for 3–4 hours, whereupon bubbling ceased and then heated at that temperature with stirring for an additional 1 hour. After cooling, the reaction mixture was poured onto crushed ice and then extracted with ether. The ether extract was dried over anhydrous sodium sulfate, the ether was distilled off and the residue was subjected to distillation under reduced pressure to give the desired product as colorless and slightly viscous oils boiling at 154–156° C./0.2 mm. Hg.

*Analysis.*—Calculated for $C_{17}H_{27}NO_3$ (percent): C, 69.59; H, 9.28; N, 4.77. Found (percent): C, 69.66; H, 9.27; N, 4.80.

IR (liquid film): $\nu_{C=O}$ 1725, 1662 cm.$^{-1}$; $\nu_{C=C}$ 1655, 1625 cm.$^{-1}$.

EXAMPLE 10

4-methacryloyloxy-2,2,6,6-tetramethylpiperidine

The reaction was conducted by the same procedure as in the above Example 4 except that 7.8 g. of 4-hydroxy-2,2,6,6-tetramethylpiperidine and 5.2 g. of methacryloyl chloride were employed. After completion of the reaction, the reaction mixture was treated in the same manner as in the above Example 4 to give an oily substance. The substance was subjected to distillation under reduced pressure to give colorless oils boiling at 74–76° C./0.5 mm. Hg, which crystallized upon being allowed to stand and the substance was recrystallized from petroleum ether to give the desired product as white crystals melting at 52–54° C.

*Analysis.*—Calculated for $C_{13}H_{23}NO_2$ (percent): C, 69.29; H, 10.29; N, 6.22. Found (percent): C, 69.30; H, 10.22; N, 6.26.

IR (Nujol mull): $\nu_{C=O}$ 1710 cm.$^{-1}$; $\nu_{C=C}$ 1637 cm.$^{-1}$.

EXAMPLE 11

4-methacrylamido-2,2,6,6-tetramethylpiperidine

To a solution of 7.8 g. of 4-amino-2,2,6,6-tetramethylpiperidine and 7 g. of triethylamine in 100 ml. of benzene was added dropwise with stirring and ice-cooling a solution of 5.2 g. of methacryloyl chloride in 50 ml. of benzene. After completion of the dropwise-addition, the resulting mixture was stirred at room temperature for 4 hours. Then, the reaction mixture was washed successively with a 5% aqueous sodium hydroxide solution and water, dried over potassium carbonate and concentrated. The residue was recrystallized from petroleum benzene to give the desired product as white crystals melting at 119–120° C.

*Analysis.*—Calculated for $C_{13}H_{24}N_2O$ (percent): C, 69.60; H, 10.78; N, 12.49. Found (percent): C, 69.54; H, 10.81; N, 12.50.

IR (Nujol mull): $\nu_{NH}$ 3350 cm.$^{-1}$; $\nu_{C=O}$ 1653 cm.$^{-1}$; $\nu_{C=C}$ 1610 cm.$^{-1}$.

EXAMPLE 12

4-cyano-4-methacrylamido-2,2,6,6-tetramethylpiperidine

The reaction was conducted by the same procedure as in the above Example 11 except that 9 g. of 4-amino-4-cyano-2,2,6,6-tetramethylpiperidine and 5.2 g. of methacroyl chloride were employed. After completion of the reaction, the reaction mixture was treated in the same manner as in the above Example 11 and the residue was recrystallized from benzene to give the desired product as white crystals melting at 109–111° C.

*Analysis.*—Calculated for $C_{14}H_{23}N_3O$ (percent): C, 67.43; H, 9.30; N, 16.85. Found (percent): C, 67.35; H, 9.36; N, 16.76.

IR (Nujoy mull): $\nu_{NH}$ 3280 cm.$^{-1}$; $\nu_{C\equiv N}$ 2220 cm.$^{-1}$; $\nu_{C=O}$ 1670 cm.$^{-1}$; $\nu_{C=C}$ 1635 cm.$^{-1}$.

What is claimed is:

1. A compound selected from the group consisting of the acrylic acid derivatives having the Formulae I and II

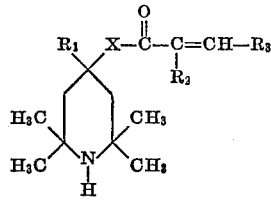
(I)

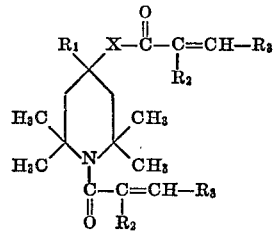
(II)

wherein $R_1$ represents hydrogen atom or cyano group; $R_2$ and $R_3$ may be the same or different and each represents hydrogen atom or methyl group; and X represents imino group or oxygen atom.

2. A compound having the formula

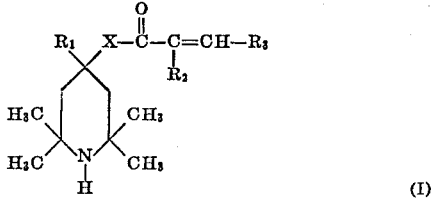
(I)

wherein $R_1$ represents hydrogen atom or cyano group; $R_2$ and $R_3$ may be the same or different and each represents hydrogen atom or methyl group; and X represents imino group or oxygen atom.

3. A compound having the formula

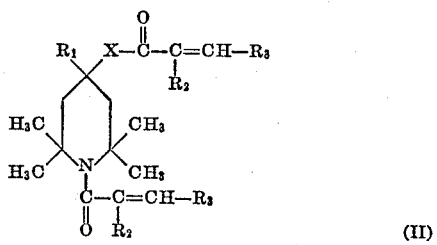
(II)

wherein $R_1$ represents hydrogen atom or cyano group; $R_2$ and $R_3$ may be the same or different and each represents hydrogen atom or methyl group; and X represents imino group or oxygen atom.

4. 4-acryloyloxy-2,2,6,6-tetramethylpiperidine.
5. 4-acrylamido-2,2,6,6-tetramethylpiperidine.
6. 1-acryloyl - 4 - acrylamido-2,2,6,6-tetramethylpiperidine.
7. 4-methacryloyloxy-2,2,6,6-tetramethylpiperidine.
8. 4-methacrylamido-2,2,6,6-tetramethylpiperidine.

References Cited

UNITED STATES PATENTS 2,792,399  5/1957  Ekenstam et al. _____ 260—294
3,505,342  4/1970  Wendler et al. _____ 260—294

HENRY R. JILES, Primary Examiner

G. T. TODD, Assistant Examiner

U.S. Cl. X.R.

260—37 R, 45.8 N, 293.87, 293.88, 293.9